Feb. 25, 1941.    J. DICKSON    2,232,841
INTERNAL COMBUSTION ENGINE
Filed Dec. 23, 1939    4 Sheets-Sheet 1
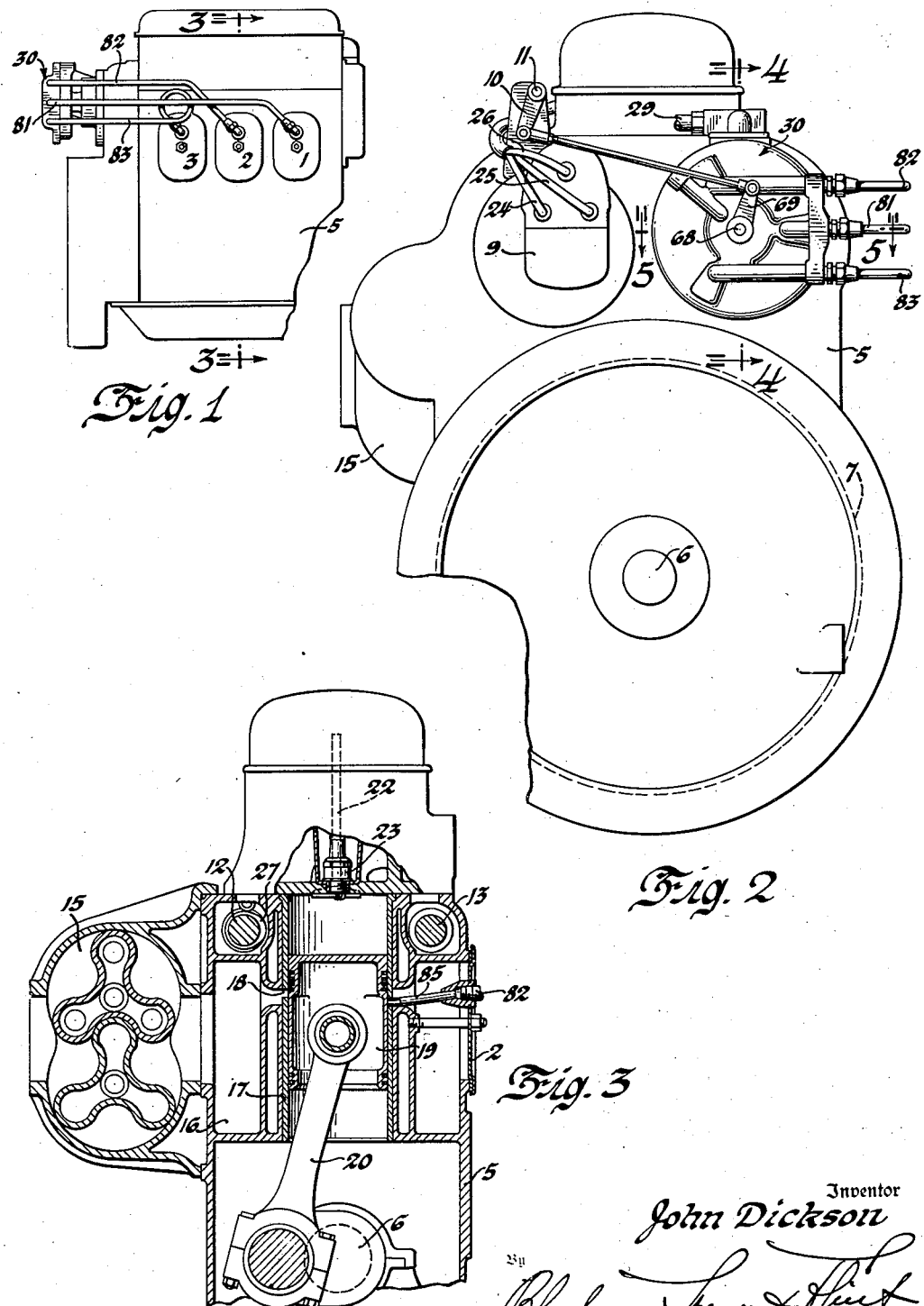
Inventor
John Dickson

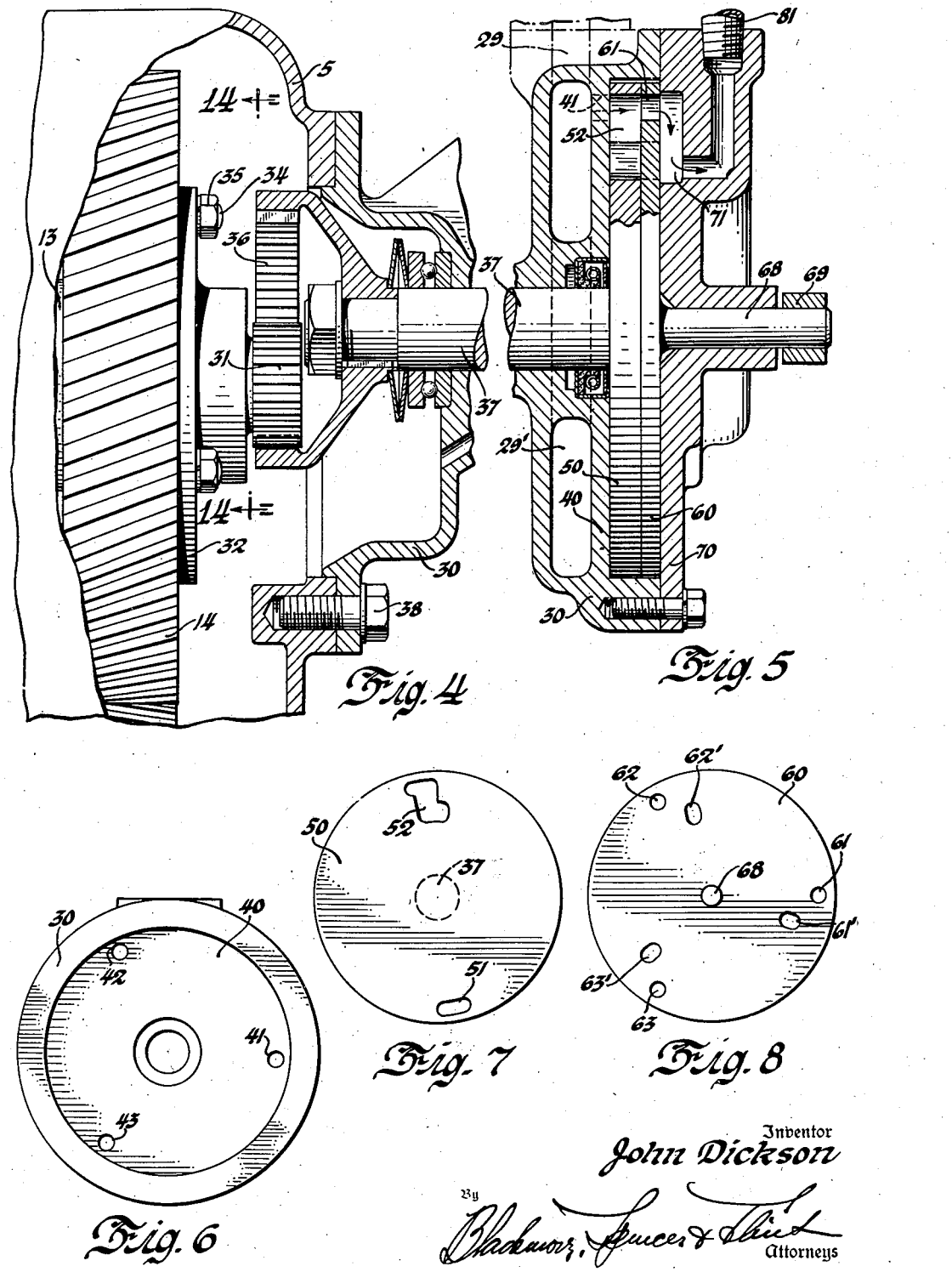

ABOVE HALF LOAD

START OF HALF LOAD TRANSITION

HALF LOAD

HALF LOAD

Inventor
John Dickson
Blackmore, Spencer & Flint
Attorneys

Feb. 25, 1941. J. DICKSON 2,232,841
INTERNAL COMBUSTION ENGINE
Filed Dec. 23, 1939 4 Sheets-Sheet 4

Inventor
John Dickson
By
Blackmore, Spencer & Flint
Attorneys

Patented Feb. 25, 1941

2,232,841

UNITED STATES PATENT OFFICE 2,232,841

INTERNAL COMBUSTION ENGINE

John Dickson, Ferndale, Mich., assignor to General Motors Corporation, Detroit, Mich., a corporation of Delaware Application December 23, 1939, Serial No. 310,723

13 Claims. (Cl. 123—52)

This invention relates to internal combustion engines, and especially to such engines in which the explosive charge consists of a relatively homogeneous explosive mixture of fuel and air, which is ignited at the proper time in each cylinder, and burned substantially at constant volume.

Such engines in which the fuel is supplied to the engine in the form of a gas or vapor have usually poor part load economy (i. e., the fuel consumption per B. H. P. is greater at loads less than full load), as distinct from Diesel engines for example, in which liquid fuel is injected into an excess of air and ignited by the heat of compression thereof, and burned at constant pressure with a fuel consumption per B. H. P. which is substantially constant irrespective of the load. The reason for the poor part load economy of the former, is that there is an ideal fuel/air ratio and compression ratio, and when at part load, the air or fuel, or both, are throttled, these ratios are not maintained. Furthermore there may be difficulty in maintaining a fuel/air ratio forming an explosive mixture which can be readily ignited.

In order to overcome the foregoing disadvantages in a gas engine, it has heretofore been proposed to cut off the supply of gaseous fuel to some of the cylinders of a multi-cylinder engine at a given part load, in order that the remaining cylinders may work at full load. It has also been proposed to change an engine from two cycle operation, to four cycle operation, at loads below half load for instance. In the former case, only some of the cylinders have provided any power at the given part load, while in the latter case, a change in the operation of the inlet and exhaust valves has at least been necessary.

The object of the present invention is an internal combustion engine, with a control means therefor to vary the quantity of fuel supplied to the engine according to the load thereon, and which is operative at loads below a selected fraction of the full load, successively to supply and to cut off the supply of fuel to the engine and interpose missing power strokes in regular progression through the normal sequence of power strokes at full load, whereby the required fractional power is obtained with a lesser number of full power strokes than at full load.

Another object of the invention is a multi-cylinder internal combustion engine, in which at loads below a selected fraction of the full load, the supply of fuel is cut off to different cylinders in succession, in regular progression and in regularly recurring sequence, so that every cylinder has the same number of power strokes and the same number of missing power strokes, in a cycle completed in a number of revolutions which is a whole multiple of the number of revolutions in which the normal full load cyclic sequence of power strokes in all the cylinders is completed; the engine working at the selected fractional load with a lesser number of full power strokes to give the required total fractional power.

A more specific object of the invention is a fuel distributor, cooperative with the engine fuel quantity control means to cut off the supply of fuel to different cylinders in succession, in regular progression and in regularly recurring sequence, at loads below a selected fraction of the full load; every cylinder having the same number of power strokes and the same number of missing power strokes, in a cycle completed in a number of revolutions of the engine crankshaft which is a whole multiple of the number of revolutions in which the normal full load cyclic sequence of power strokes in all the cylinders is completed.

The above and other objects of the invention will be apparent as the description proceeds.

It will be appreciated that the selected fractional power may be either the said fractional power of the I. H. P. or the said fractional power of the B. H. P., although the latter can only be the case if the I. M. E. P. per power stroke is increased at the fractional load, for the reason that the total friction and pumping losses are substantially the same, irrespective of the number of power strokes. Needless to say, it is desirable to increase the I. M. E. P. per power stroke where this is practicable and it will usually be possible to do this by increasing the fuel/air ratio in the working cylinders, because the interposed idle strokes provide for better scavenging and cooling, which will permit of the use of a higher I. M. E. P. per cylinder.

For example, a three cylinder engine of 90 lbs. per sq. in. I. M. E. P. per cylinder at full load, with friction and pumping losses equivalent to 20 lbs. per sq. in. M. E. P. per cylinder, will have a total of 210 lbs. per sq. in B. M. E. P. for all three cylinders, and the following table shows how the I. M. E. P. per cylinder must be increased to give the selected fractional power of the B. H. P.

| B. H. P. load | Relative number of cylinders in operation | Total B. M. E. P., lbs. per sq. in. | Total M. E. P. losses, lbs. per sq. in. | Total I. M. E. P., lbs. per sq. in. | I. M. E. P. per cylinder, lbs. per sq. in. |
|---|---|---|---|---|---|
| Full | 3 | 210 | 60 | 210+60=270 | $\frac{270}{3}=90$ |
| ½ | 3/2 | 105 | 60 | 105+60=165 | $\frac{165\times2}{3}=110$ |
| ¼ | 3/4 | 52½ | 60 | 52½+60=112½ | $\frac{112½\times4}{3}=150$ |

According to the invention, the distributor and fuel quantity control means may broadly consist of four, coacting, ported disc valve parts. Taking them in order, the first is stationary and is provided with as many inlet ports to the distributor as there are engine cylinders; the second is the distributor rotor disc, provided with as many ports, as the denominator of the fractional load, and which is driven by the engine; the third is a control disc turnable by the fuel quantity controlling means, and provided with as many sets of ports, equal in number to the inlet ports, as there are required transitions to different numerators for different loads of the same denominator; the fourth is stationary, and is provided with as many outlet ports as there are engine cylinders. The first and fourth disc valve ports are conveniently the ends of a cylindrical housing, in which the second and third, rotating and turnable discs respectively, are mounted. The arrangement is such that at that stage in the movement of the third or control disc, when the quantity of fuel supplied to the engine cylinders has been reduced to the amount required to sustain the given fractional load, one or more of the ports in the rotor will at all times be masked by the third and fourth discs, and the outlet from the remainder of the rotor ports will be fully open, whenever it, or they, are coincident with any of the inlet ports in the housing. While at full load, all of the ports in the rotor are operative in their turn, to provide a through path for the supply of fuel to the engine, fewer of them are operative at the successive stages in the movement of the control disc.

The denominator of the fractional load can have any suitable value, provided the number of cylinders and the denominator are not whole multiples of each other, and that if the least common multiple of the number of cylinders and the denominator is less than their product, the numerator is equal to, or a multiple of, the product divided by the least common multiple.

In practice, a single transition at half load or thereabouts may be all that is desired, but the distributor may be arranged to provide as many transitions as there are multiples of the lowest workable numerator.

The speed at which the distributor rotor disc is driven, is in every instance, the speed of the engine, divided by the number of revolutions in which the normal cycle in one cylinder is completed, divided by the lowest common denominator of the required workable fractional transitions.

The minimum number of strokes in which the cycle, of power and missing power strokes in all the cylinders, may be completed, is equal to the number of cylinders, times the number of revolutions in which the normal cycle in one cylinder is completed, times the denominator of the fraction reduced to its lowest terms.

The number of power and missing power strokes in each recurring sequence, is equal to the denominator, multiplied by the number of strokes in a complete cycle, divided by the least common multiple of the number of cylinders and the denominator.

Thus, for instance, a three-cylinder engine can be worked at half load with half the number of full power strokes for half the I. H. P., or with half the number of greater power strokes for half the B. H. P. The denominator can be two, and if it is a two cycle engine, the rotor disc will be driven at half engine speed; the cycle will be completed in three times two equals six strokes; and the number of power and missing power strokes in each recurring sequence will be two multiplied by six, divided by six, equals two; with one power stroke followed by one missing power stroke.

If a transition to three quarters and/or quarter load operation is required in a three cylinder two cycle engine, the denominator will be four. The rotor disc will be driven at one quarter engine speed; the cycle will be completed in three times four equals twelve strokes; and the number of power and missing power strokes in each recurring sequence will be four, multiplied by twelve, divided by twelve, equals four; three power strokes will be followed by one missing power stroke at three quarters load, and one power stroke will be followed by three missing power strokes at quarter load. A half load transition can of course be obtained with the same distributor, provided the control disc is arranged to provide for this. The cycle at half load will be completed in three, times two, equal six strokes; and the number of power strokes and missing power strokes in each recurring sequence will be four, multiplied by six, divided by twelve, equals two, with one power stroke followed by one missing power stroke. It will be appreciated that two power strokes could be followed by two missing power strokes, but in such case, twelve strokes would be required for completion of the cycle through all the cylinders whereas the minimum is six strokes.

A six-cylinder engine cannot be arranged to work at half load with a denominator of two, because six is a whole multiple of two. It can however, according to the invention, be arranged to work at half load with a denominator of four, and a numerator which is two, the rotor running at half engine speed; and at three quarters, half, and quarter load, with fractions which are respectively ⅚, ⅘, and ⅖, the rotor running at quarter engine speed. It can be arranged to work at two thirds and one third load, if the fractions are respectively ⁴⁄₉ and ²⁄₉, the rotor running at one third engine speed.

When the total number of cylinders is divisible into a plurality of groups, of cylinders equal in number to the least common multiple of the total number of cylinders and the denominator of the selected fraction, divided by the said denominator, the cylinders of each group having power strokes spaced at equal crank angles from each other, it is dealt with as such. Thus the six cylinder engine is in reality considered as two sets of three cylinders. Separate and distinct sets of equally spaced ports for each of the respective groups of cylinders will be required, and may all be provided in the disc valve parts of one distributor, or there may be as many distributors as there are sets of ports, as may be most convenient. In any case the sets of ports for each group of cylinders will be phased relatively to each other, to suit the relative phasing of the power strokes of the groups of cylinders.

The drawings show the application of the invention to a three-cylinder two-cycle gas engine, having a transition to half the number of full power strokes at half load. In addition the elements of a distributor for a four-cylinder two-cycle gas engine, to provide a transition to 2/3 the number of full power strokes at 2/3 load, and a second transition to 1/3 the number of full power strokes at 1/3 load, are shown.

In the drawings:

Fig. 1 is a somewhat diagrammatic elevation of the engine.

Fig. 2 is an enlarged end view of Fig. 1 showing the gas distributor and the magneto, and their connections to the engine.

Fig. 3 is an enlarged part sectional view on line 3—3 of Fig. 1.

Fig. 4 is an enlarged broken away part sectional view on line 4—4 of Fig. 2.

Fig. 5 is an enlarged sectional view on line 5—5 of Fig. 2.

Figs. 6 to 9 are views of the elements of the distributor (shown in section in Fig. 5) in separated relationship.

Figure 9:
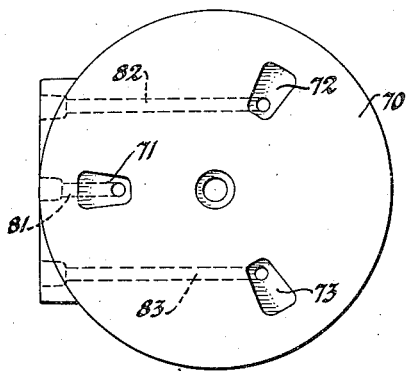

The engine to which the invention has been applied, has three cylinders, one, two and three, with a normal firing order at full load, of one, two, three for a power stroke every 120° of crankshaft rotation, and in each cylinder, once every revolution of the crankshaft.

In Fig. 1, hand hole cover plates designated 1, 2 and 3, one for each of the cylinders, indicate also, the relative positions of the respective cylinders.

Referring to Figs. 1 to 3, the engine has a frame 5, a crankshaft 6, a flywheel 7, a magneto 9, and a control means for the engine, constituted by a lever 10, on a shaft 11 which is turnable through an arc of a circle, either manually or in response to the movement of the engine governor (not shown).

As shown in Fig. 3, the engine is provided with two balancing shafts 12 and 13, provided with suitable masses to balance primary inertia forces. The two shafts 12 and 13 are both driven at engine speed from the crankshaft 6 through suitable gearing of which only the gear wheel 14 (Fig. 4) on the shaft 13 is shown. A blower 15 supplies air under pressure to a gallery 16 surrounding the cylinders. Each of the cylinders has a liner such as 17 provided with inlet ports such as 18, and a piston such as 19 with a connecting rod such as 20 to the crankshaft 6. Air from the gallery 16, enters each of the cylinders through a belt of a large number of drilled inlet ports such as 18, which are controlled by the pistons such as 19. Each cylinder has an exhaust valve such as 22, and a spark plug such as 23. The respective spark plugs are connected to the magneto 9 by the leads 24, 25 and 26. The exhaust valves are actuated through gearing (not shown) by cams such as 27 on the shaft 12.

Remaining details of the engine proper are conventional, and since they form no part of the present invention, will not be described.

The distributor according to the invention is designated generally by the reference numeral 30 of its housing.

The inlet ports of the distributor are connected to a suitable source of gas supply (not shown, but which may be Town's gas or natural gas for instance), by the pipe 29, which leads to a chamber 29′ in the distributor housing, as shown in Fig. 5.

Alternatively of course, the gas could be supplied to the distributor by a blower driven from the engine. If in these circumstances the blower drive has a fixed speed ratio, it will be obvious that suitable bypass means could be provided for the return of excess fuel to the inlet side of the blower, when the engine is working at part load and only a part of the blower fuel output is required.

Delivery pipes 81, 82 and 83 from the distributor 30, extend through the cover plates 1, 2 and 3, with outlet pipes such as 85 into one or more of the inlet ports such as 18 in each of the respective cylinders.

The housing 30 of the distributor and fuel quantity control means includes a cylindrical part, with ported end walls between which are mounted a ported distributor rotor disc driven by the engine, and a ported control disc turnable by the fuel quantity controlling means.

Figure 14:
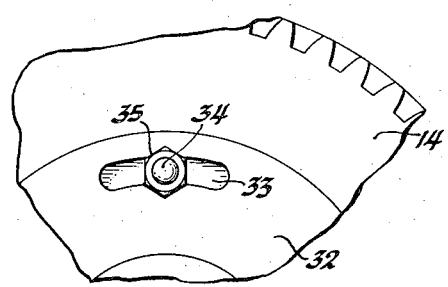
Fig. 14 is a partly broken away view on line 14—14 of Fig. 4.
Figure 15:
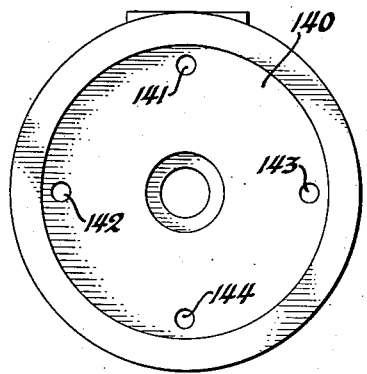
Figs. 15 to 18 are views similar to Figs. 6 to 9 but showing the elements of the distributor for a four-cylinder two-cycle engine.

As shown in Figs. 4 and 5, a pinion 31, coaxial with the gear wheel 14, is secured to a flange 32 with circumferentially slotted holes 33 (Fig. 14), through which it is adjustably secured to bolts 34 on the gear wheel 14 by nuts 35.

The pinion 31 gears with an internal gear wheel 36 having twice the number of teeth as the pinion 31, and secured to one end of a shaft 37 suitably supported in the housing 30 which is secured to the engine frame 5 by bolts such as 38. The distributor rotor disc is secured to the other end of the shaft 37, and is thus driven at half engine speed.

Referring now to Figs. 5 to 9, the end wall 40 of the cylindrical part of the housing is provided with inlet ports 41, 42 and 43, from the supply chamber 29′, one for each cylinder of the engine. They are identical, and spaced equal distances from each other, at 120° in a circle of which the axis of the rotor is the center.

The distributor rotor disc 50 is provided with two ports 51 and 52, spaced at 180° from each other, in a circle having a radius equal to that of the circle of inlet ports 41, 42 and 43. Both ports 51 and 52 are circumferentially elongated, the port 52 being radially elongated to extend through a greater radial distance than the port 51, from the circle of inlet ports.

The control disc 60 is provided with two sets of ports 61, 62, 63, and 61', 62', 63'. The ports of each set are spaced from each other at 120° like the inlet ports, but while the ports 61, 62, 63, are disposed in a circle having a radius equal to that of the circle of inlet ports, the ports 61', 62', 63', are angularly displaced from the ports 61, 62 and 63, in a circle of different radius, so that while both of the ports 51 and 52 in the rotor can coact with the ports 61, 62, 63, only the port 52 can coact with the ports 61', 62', 63' in the control disc.

The control disc 60 is secured to a shaft 68, coaxial with the shaft 37, in the housing 30. The control lever 10 (Fig. 2), is linked to a lever 69 on the shaft 68, for turning thereof to vary the quantity and the manner of supplying fuel to the various cylinders of the engine, as hereinafter described.

The end wall 70 of the housing is provided with outlet ports 71, 72 and 73, one for each cylinder of the engine, and connected to the delivery pipes 81, 82 and 83 respectively. The outlet ports 71, 72 and 73 are identical, and spaced equal distances from each other, at 120° in a circle of which the axis of the rotor is the center, and are radially and circumferentially elongated to cooperate with the ports in the end wall 40, and in the distributor rotor disc 50 and the control disc 60.

Referring now to Figs. 10 to 13, these figures show relative instantaneous positions of the ports in the distributor parts, as seen from the outlet end of the distributor with the end wall 70 removed. The position of the outlet port 72 in the assembled position of the end wall 70 is shown in dot and dash lines. The end walls 40 and 70 are of course stationary, and the inlet and outlet ports such as 42 and 72 therein, remain fixed, and are so shown in all the Figures 10 to 13. The relative position of the ports 42, 62 and 72 for cylinder 2 in all the respective figures is representative also of the relative positions of the equivalent ports for the remaining cylinders 1 and 3. It will be appreciated that the ports such as 42, 62 and 72 are masked by the rotor 50 except when the ports 51 or 52 therein, provide a path for flow therethrough, as the rotor revolves. As seen in these same figures, the rotor disc rotates clockwise, while the control disc is moved through an angle in an anti-clockwise direction as the load on the engine is reduced and conversely as the load on the engine is increased.

As the load on the engine is reduced, the lever 10 (Fig. 2) is moved either manually, or by the engine governor, in a clockwise direction, moving the lever 69, the shaft 68 and the control disc 60 which is secured thereto, in an anticlockwise direction. In the Figures 10 to 13, the control disc 60 is moved anticlockwise progressively, from the position shown in Fig. 10, through the position shown in Fig. 11, to the position shown in Figs. 12 and 13.

The maximum amount of fuel is supplied to the engine cylinders when the ports such as 62 in the control disc are axially coincident with the inlet ports such as 42 in the end wall 40 of the housing, because in these circumstances both ports 42 and 62 are fully uncovered for the greatest period of time by the ports 51 or 52 in the rotor 50 as it revolves.

Figure 10:
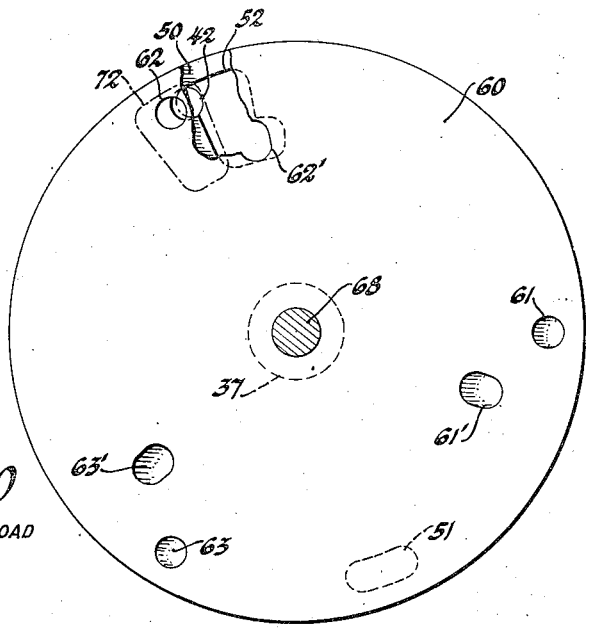
Figs. 10 to 13 are partly broken away views of the elements of Figs. 6 to 9, showing relative instantaneous positions of the ports therethrough, corresponding to "above half load," "start of half load transition," and two different positions of the rotor disc at "half load," respectively, as seen from the outlet end of the distributor.

In Fig. 10, a lesser quantity of fuel than maximum is being supplied to the engine cylinders because the control disc has been turned to a position in which the ports such as 62 and 42 are not axially coincident, and both will therefore be fully uncovered for a lesser period of time by the ports 51 or 52 in the rotor 50 as it revolves. It will be noted that the ports such as 62' are inoperative because they are not open to the ports such as 72 but are masked by the end wall 70.

Both of the ports 51 and 52 in the rotor 50 will in their turn unmask the ports such as 42 and 62 as the rotor revolves, but since the rotor revolves at half engine speed and the ports 51 and 52 are disposed at 180°, it will be seen that they will supply fuel to the engine cylinders in the order 1, 2, 3, one every 120° of crankshaft rotation.

Figure 11:
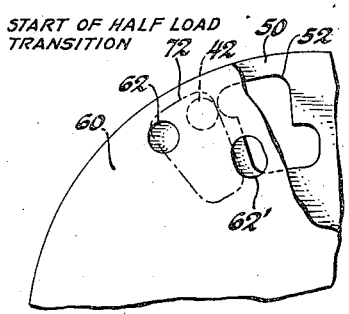

In Fig. 11 the control disc 60 has been moved still further in a direction reducing the fuel supply, to a position in which the port 62 therein is beginning to be masked by the end wall 70 and is still further away from being coaxial with the port 42, so that both the area of the through path and the period of time it is uncovered by the ports 51 and 52 of the rotor will be reduced. The port 62' has however reached a position in which it is beginning to be unmasked by the port 72 to provide a further path of flow through the control disc 60. As this occurs there is a temporary increase in the quantity of fuel supplied to the engine cylinders, and if the control disc 60 is governor controlled it will be moved quite rapidly to the position shown in Fig. 12.

Figure 12:
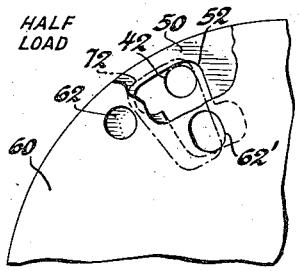

In Fig. 12, the control disc has been turned to a position in which the port 62 therein will be completely masked by the end wall 70, and inoperative, while the port 62' is fully uncovered by the port 72, or approximately so. In this condition the port 52 in the rotor can provide a path of flow through the ports 42 and 62', but the port 51 can not.

Figure 13:
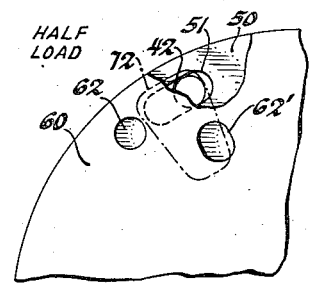

In Fig. 13, the control disc 60 with its ports such as 62 and 62' is in the same position as in Fig. 12, but the rotor has turned through 180°.

It will be seen that in the position of the control disc shown in Figs. 12 and 13, whenever the port 42 is uncovered by the port 51, the port 62' is masked by the disc 50, and the port 51 is therefore inoperative. Only the port 52, in the rotor 50 rotating at half engine speed, will supply fuel to the engine cylinders in the order 1, 3, 2, one every 240° of crankshaft rotation, and there will be alternately a power stroke and a missing power stroke, in the normal firing sequence 1, 2, 3, of the engine cylinders. There will thus be full power operation of half the number of cylinders in a given time, giving half the total torque capacity of the engine. From half torque down to no load, the control disc reduces the fuel supply, to the extent that the ports 61', 62' and 63' therein are moved away from radial alignment with the inlet ports 41, 42 and 43, reducing the period of time in which the port 52 in the rotor uncovers the ports such as 42 and 62', and further to the extent that the ports such as 62' become masked by the end wall 70, and their area open to the ports such as 72 is reduced.

Referring now to Figs. 15 to 18, which show the elements of a distributor for a four-cylinder two-cycle gas engine, it will be appreciated that the parts are essentially the same as those for the three-cylinder engine thus far described except as follows.

The end wall 140 of the cylindrical part of the housing is provided with inlet ports 141, 142, 143, 144, one for each cylinder of the engine. They are identical, and spaced equal distances from each other at 90° in a circle of which the axis of the rotor is the center.

The distributor rotor disc 150 is provided with three ports 151, 152 and 153 spaced at 120° and is driven at 1/3 engine speed. The port 152 is radially elongated to extend through a greater radial distance than the port 151 and the port 153 is radially elongated to extend through a greater radial distance than the port 152.

The control disc 160 is provided with three sets of ports, consisting of ports 161, 162, 163, 164, ports 161', 162', 163', 164' and ports 161", 162", 163", 164". The ports of each set are spaced from each other at 90° like the inlet ports, but while the first named set of ports are disposed in a circle having a radius equal to that of the circle of inlet ports, the second and third sets are angularly displaced from the first set and from each other in circles of different radii, so that while all of the ports 151, 152 and 153 in the rotor 150 can coact with the first named set of ports in the control disc, only the ports 152 and 153 can coact with the second set, and only the port 153 can coact with the third set therein.

Figure 16:
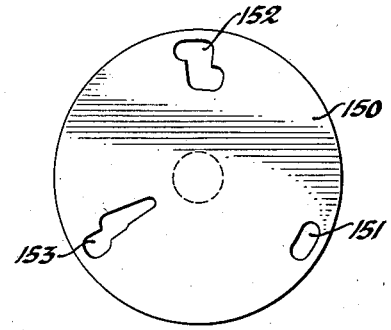
Figure 17:
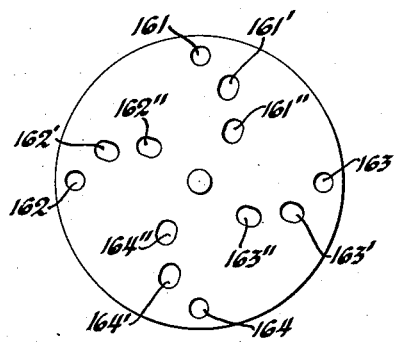
Figure 18:
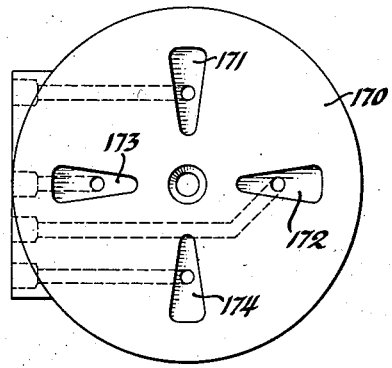

The end wall 170 of the distributor housing is provided with outlet ports 171, 172, 173 and 174, one for each cylinder of the engine. These ports are identical and are spaced equal distances from each other at 90° in a circle of which the axis of the rotor is the center, and are radially and circumferentially elongated to cooperate with the ports in the end wall 140, and in the distributor rotor disc 150 and the control disc 160. As seen in Fig. 16 and Fig. 17, the rotor disc rotates clockwise at one-third engine speed, while the control disc is moved through an angle in an anti-clockwise direction as the load on the engine is reduced and conversely as the load on the engine is increased.

The operation of these parts for a four-cylinder engine will readily be understood without further explanation since it is essentially similar to that of the parts for a three-cylinder engine as fully described heretofore, except that there is a first transition at two-thirds load and a second transition at one-third load.

Assuming the engine has a normal full load cylinder firing order of 1, 2, 4, 3, in a cycle completed in one revolution or four strokes, at two-thirds load, two power strokes will be followed by a missing power stroke with a firing order of 1, 2, 3, 1, 4, 3, 2, 4, in a cycle completed in three revolutions or twelve strokes; and at one-third load, one power stroke will be followed by two missing power strokes with a firing order of 1, 3, 4, 2 in a cycle completed in three revolutions.

I claim:

1. In an internal combustion engine, control means therefor, to vary the quantity of fuel supplied to the engine according to the load thereon, including a stationary member, a member driven by the engine and a member responsive to movement of the control means for the engine; said members constituting coacting valve parts cooperative at loads below a selected fraction of the full load, successively to supply and to cut off the supply of fuel to the engine, and interpose missing power strokes in regular progression through the normal sequence of power strokes at full load, whereby the required fractional power is obtained with a lesser number of full power strokes than at full load.

2. The combination according to claim 1, in which at the selected fractional load, the required brake horse power is obtained with a lesser number of greater power strokes than at full load.

3. The combination according to claim 1, in which the control means is operative to supply the full quantity of fuel for a lesser number of full power strokes at the selected fractional load, as well as for the full number of full power strokes at full load.

4. The combination according to claim 1, in which the distributing means includes a rotor driven by the engine and a control member turnable in response to the movement of the control means for the engine; said rotor and member being enclosed between opposite ends of a housing, and said rotor, control member, and the opposite ends of the housing, being ported to constitute coacting rotary disc valve parts.

5. A multi-cylinder internal combustion engine including distributing means for distributing fuel to the various cylinders, and a control means for the engine, to vary the quantity of fuel supplied to the various cylinders according to the power required therefrom; said distributing means and control means being cooperative at loads below a selected fraction of the full load to cut off the supply of fuel to different cylinders in succession, in regular progression, and in regularly recurring sequence; every cylinder having the same number of power strokes and the same number of missing power strokes, in a cycle completed in a number of revolutions of the engine crankshaft which is a whole multiple of the number of revolutions in which the normal full load cyclic sequence of power strokes in all the cylinders is completed.

6. The combination according to claim 5, in which at the selected fractional load, the power strokes in the various cylinders occur in a different order of succession and at greater angular intervals of the crankshaft rotation than at full load.

7. The combination according to claim 5, in which the denominator of the selected fractional load is such that the number of cylinders and the denominator are not whole multiples of each other, and that if the least common multiple of the number of cylinders and the denominator is less than their product, the numerator of the selected fractional load is equal to, or a multiple of, the product divided by the least common multiple.

8. The combination according to claim 5, in which the distributor includes a rotor constituting a ported disc valve part which is driven at the speed of the engine, divided by the number of revolutions in which the normal cycle in one cylinder is completed, divided by the lowest common denominator of the required workable fractional transitions.

9. The combination according to claim 5, in which the cycle of power and missing power strokes in all the cylinders, is completed in a number of strokes equal to the number of cylinders multiplied by the number of revolutions in which the normal cycle in one cylinder is completed, multipiled by the denominator of the fraction reduced to its lowest terms.

10. A multi-cylinder engine according to claim 5, which is divisible into a plurality of groups, of cylinders equal in number to the least common multiple of the total number of cylinders and the denominator of the selected fraction of the full load, divided by the said denominator, the cylinders of each group having power strokes spaced at equal crank angles from each other; the distributing means including separate and distinct sets of equally spaced ports for each group of cylinders, the sets of ports for each group of cylinders being phased relatively to each other to suit the relative phasing of the power strokes of the groups of cylinders.

11. A multi-cylinder engine according to claim 5, which is divisible into a plurality of groups of cylinders equal in number to the least common multiple of the total number of cylinders and the denominator of the selected fraction of the full load, divided by the said denominator, the cylinders of each group having power strokes spaced at equal crank angles from each other; the distributing means including sets of equally spaced ports in separate distributors for each group of cylinders, the set of ports for each group of cylinders being phased relatively to each other to suit the relative phasing of the power strokes of the groups of cylinders.

12. A two-cycle, three-cylinder, internal combustion engine, having distributing means for distributing fuel to the respective cylinders one, two and three in the order one, two, three, one every 120° of crankshaft rotation, at full load, in a cycle completed in one revolution of the engine crankshaft, and a control means for the engine, to vary the quantity of fuel supplied to the various cylinders according to the power required therefrom; said distributing means and control means being cooperative at loads below half load to cut off the supply of fuel to alternate cylinders one, three, two, in regularly recurring sequence through the normal sequence of power strokes at full load, while fuel is distributed to the cylinders in the same order one, three, two, one every 240° of crankshaft rotation in a cycle completed in two revolutions of the engine crankshaft, there then being alternate power and missing power strokes in regular progression through the normal sequence of power strokes at full load, with full power operation of half the number of cylinders in a given time, at half load.

13. The combination according to claim 12 in which each cylinder is provided with piston controlled inlet ports, and pipes from the distributor to each cylinder, conduct the fuel to at least one of the inlet ports in each cylinder.

JOHN DICKSON.